(12) United States Patent
Gough et al.

(10) Patent No.: US 7,093,753 B2
(45) Date of Patent: *Aug. 22, 2006

(54) POCKET

(75) Inventors: Paul A. Gough, Smallfield (GB); Jonathan Farringdon, Pittsburgh, PA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/984,136

(22) Filed: Nov. 9, 2004

(65) Prior Publication Data

US 2005/0092832 A1    May 5, 2005

Related U.S. Application Data

(63) Continuation of application No. 10/028,125, filed on Dec. 21, 2001, now Pat. No. 6,834,797.

(30) Foreign Application Priority Data

Dec. 27, 2000   (GB)  ................................ 0031616.6

(51) Int. Cl.
  *G06K 5/00*   (2006.01)
  *A45F 5/02*   (2006.01)
(52) U.S. Cl. .......................................... 235/382; 24/3.5
(58) Field of Classification Search ................ 235/382; 24/3, 3.5; 109/45–49, 56; 340/5.73, 571, 340/568.1, 568.7; 361/172; 224/650, 652–654
See application file for complete search history.

(56) References Cited

U.S. PATENT DOCUMENTS

| 4,194,271 | A | * | 3/1980 | Hamilton | 24/3.5 |
| 4,355,440 | A | * | 10/1982 | Johansson et al. | 24/3.5 |
| 4,495,540 | A | * | 1/1985 | Remington et al. | 361/172 |
| 4,891,865 | A | * | 1/1990 | Biloff | 24/3.5 |
| 5,031,281 | A | * | 7/1991 | Devylder | 24/3.5 |
| 5,153,561 | A | * | 10/1992 | Johnson | 340/571 |
| 5,475,378 | A | * | 12/1995 | Kaarsoo et al. | 340/5.6 |
| 5,477,562 | A | * | 12/1995 | Dixon | 2/250 |
| 5,701,828 | A | * | 12/1997 | Benore et al. | 109/56 |

FOREIGN PATENT DOCUMENTS

GB    2049023 A  * 12/1980

* cited by examiner

*Primary Examiner*—Thien M. Le
*Assistant Examiner*—April A. Taylor

(57) ABSTRACT

A pocket suitable for incorporation in garments, luggage items, personal accessories or the like is provided with an active mechanism and control apparatus to close the pocket. Such closing action may be triggered manually but can also be triggered automatically when the pocket is moved away from an upright orientation or experiences a jolting action. In one embodiment the closing action is performed by a length of shape memory material which contracts when heated to pull the pocket front panel top portion against the rear panel top portion and close the pocket opening.

7 Claims, 2 Drawing Sheets

POCKET

This is a continuation of U.S. patent application Ser. No. 10/028,125 filed on Dec. 21, 2001 now U.S. Pat. No. 6,834,797.

The present invention relates to pockets suitable for incorporation in garments, luggage items, personal accessories or the like and in particular to pockets which are intended to prevent any items held in the pockets from falling out inadvertently.

It is commonplace to provide garments with pockets so that the owner can carry items around by placing them in the pockets. However, it is possible for items to be unintentionally ejected from or to fall out of those pockets due to movements of the user. This is particularly likely when a person begins to run which imparts a jolting motion to the pocket. When a person bends down causing the pocket to adopt an orientation unsuitable for containing an object the object will fall out. In the latter case shirt pockets are particularly susceptible to this problem. At best the occurrence of an item falling out of a pocket is an inconvenience. However, where items are valuable the resulting loss of the item or damage caused to the item through it falling out of the pocket can be a more serious issue. One known attempt to address this problem is through the inclusion of a fastening device such as a zip or button and hole arrangement to close the opening of the pocket. The provision of such devices can be beneficial but in certain cases can be detrimental to the appearance of the garment. Furthermore, such fastening devices require a person to remember to actively fasten closed the pocket opening. If a person forgets to do this, items can fall out of pockets as before. Another issue is that where a person does actually remember to fasten the device, they must actively unfasten the device in order to access the interior of the pocket and retrieve items located in that pocket. In those cases where frequent access to the pocket is required, the repeated task of fastening and unfastening of the pocket opening can become inconvenient which then discourages the user to fasten the pocket on a regular basis.

It is an object of the present invention to provide an improved pocket which is capable of reducing the likelihood of objects held therein from falling out inadvertently or being ejected accidentally.

In accordance with a first aspect of the present invention there is provided a pocket suitable for incorporating in a garment, luggage item, personal accessory, or the like, said pocket including restriction means to restrict the insertion of objects into, or removal of objects from the pocket, the restriction means being controllable to cause the said restriction means to restrict to apply a restricting action on the occurrence of an enabling signal. The restriction means may be provided in the form of mechanical means responding to the enabling signal.

Therefore on the occurrence of the enabling signal the restriction means is activated to restrict the insertion into or removal of objects from the pocket. Such restriction serves to reduce the likelihood of objects held either partially or completely in the pocket from falling out inadvertently or being ejected accidentally.

The enabling signal may be generated at the command of the user. This allows the user to activate the restriction means at will which is typically done when the user is aware that they are about to commence an activity of the type bringing about circumstances in which it is possible that items may be ejected from the pocket. A user may choose to activate the restriction means for other reasons, for example when the user becomes aware that they are in an environment where the probability of unauthorised removal of objects from the pockets is relatively high.

The enabling signal may be generated in response to output signal status of at least one sensor. The sensor may be an orientation sensor arranged to produce an output signal dependent on the orientation of the pocket, the output signal initiating generation of the enabling signal when the pocket adopts an orientation in which it is possible that objects placed in the pocket will fall out.

A pocket featuring this arrangement is particularly suitable for use in the form of a shirt pocket. When someone wearing the shirt bends down towards the ground the pocket opening may become positioned closer to the ground than the base of the pocket which can cause any objects carried in the pocket to fall out of the pocket opening under the influence of gravity. However, with the present arrangement when a person wearing a shirt having a pocket made in accordance with the present invention bends down towards the ground the orientation sensor may establish that the pocket opening is about to be positioned closer to the ground than the pocket base and produces an output signal to initiate generation of the enabling signal and cause activation of the restriction means. Preferably the orientation sensor initiates generation of the enabling signal whenever it is possible that objects placed in the pockets will fall out which in practice includes orientations in addition to the case where the pocket opening is closer to the ground than the pocket base, for example when the pocket base and pocket opening are generally at the same distance from the ground, or where the pocket opening is further from the ground than the pocket base but by only a relatively small amount.

The sensor may be an accelerometer arranged to produce an output signal dependent on acceleration experienced by the pocket, the output signal initiating generation of the enabling signal when the sensor output signal indicates that the pocket is undergoing jolting movement. Such movement may be experienced when the pocket is being worn by a person who is running, in which case activation of the restriction means will help to prevent ejection of items held in the pocket.

Other aspects and optional features of the present invention appear in the appended claims which are incorporated herein by reference, and to which the reader is now referred.

The present invention will now be described with reference to the Figures of the accompanying drawings in which.

Figure 1:
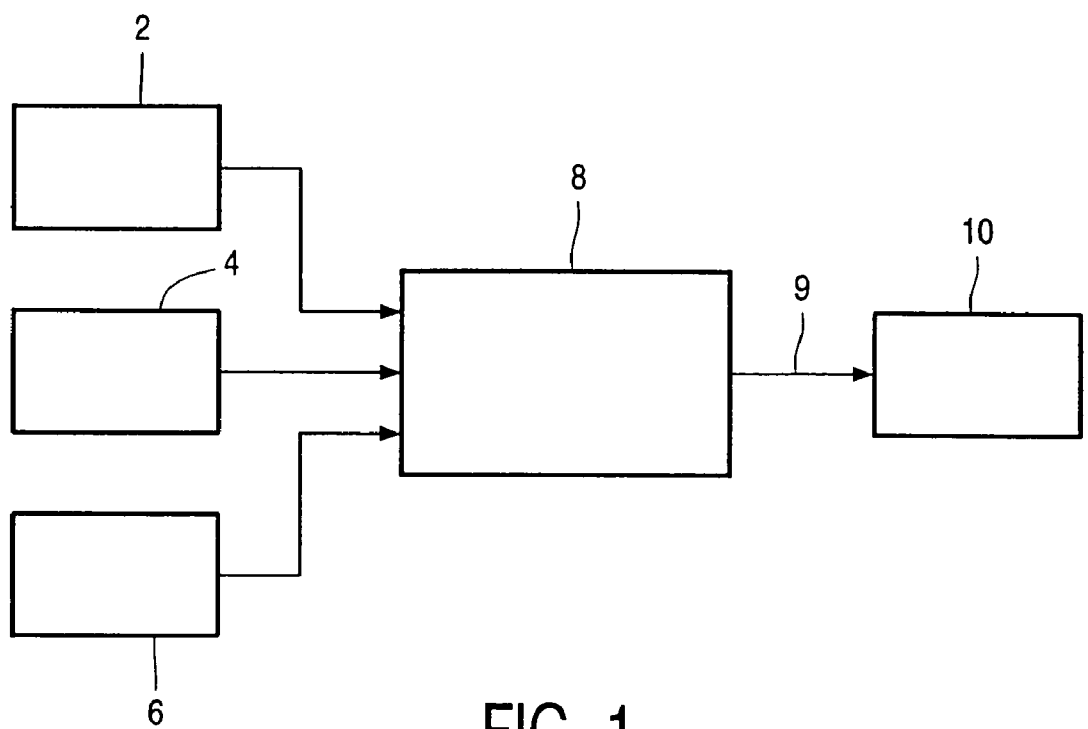
FIG. 1 is a schematic representation of functional components of a pocket made in accordance with the present invention.

Referring to FIG. 1, the functional components of the pocket include a first sensor 2, a second sensor 4, user input device 6, controller 8, and actuator 10.

The first sensor 2 is an orientation sensor used to establish the orientation of the pocket. To perform this function the sensor is attached to the pocket itself, or where the pocket is fastened to an item, such as a garment, the sensor may be attached to a portion of the item which will reliably reflect the orientation of the pocket.

The second sensor 4 is an accelerometer to measure the acceleration of the pocket. To perform this function the second sensor 4 is attached to the pocket itself, or where the pocket is fastened to an item, such as a garment, the sensor may be attached to a portion of the item which will reliably reflect the acceleration experienced by the pocket.

The user input device 6 provides a user with a means to control pocket operation. This may be a simple switch or a more elaborate device. Output signals from sensors 2, 4, and user input device 6 are provided to controller 8. The signals provided to the controller 8 are used by the controller to determine if an enabling signal should be generated at controller output 9 which enabling signal is provided to actuator 10. The presence of the enabling signal at controller output 9 causes actuator 10 to operate. By suitably incorporating actuator 10 in a pocket, operation of the actuator 10 will result in the pocket assuming a configuration which restricts or impedes the removal of any objects from the pocket as will be explained in more detail hereinafter.

Such configuration is capable of restricting or impeding such removal irrespective of whether the removal is attempted manually, involves the objects falling from the pocket or objects being ejected (thrown) from the pocket. Such assumed configuration may also restrict or impede insertion of the objects into the pocket.

When the first sensor (orientation sensor) 2 determines that a pocket is substantially upright, that is the pocket is orientated with the pocket opening positioned at a higher level than the pocket base, an object placed inside the pocket will be held therein by gravity and will not have a tendency to fall out. While the pocket is in this orientation the output signal from the sensor 2 is such that the controller 8 does not cause the enabling signal to be generated at controller output 9 and the actuator 10 does not operate. Conversely, when the first orientation sensor 2 determines that the pocket is not substantially upright, that is where the pocket is orientated with a pocket opening positioned at a higher level than the pocket base but by a smaller amount than when the pocket is substantially upright, or where the orientation sensor 2 determines that the pocket opening is positioned at the same level as the pocket base or even at a lower level than the pocket base, any object placed inside the pocket will be more susceptible to falling out. While the pocket is in any of these configurations, the output signal from the sensor 2 causes the controller 8 to generate an enabling signal at the controller output 9. This in turn causes operation of the actuator 10 which results in the pocket assuming a configuration which restricts or impedes the removal of any objects held in the pocket.

When the pocket is experiencing acceleration due to jolting movement, the second sensor 4 (accelerometer) also experiences such acceleration and produces an output signal representing such acceleration. This signal is provided to the controller 8. In response to receiving this signal the controller 8 generates an enabling signal at the controller output 9. This in turn causes operation of the actuator 10. Such operation of the actuator results in the pocket assuming a configuration which restricts or impedes the removal or ejection of any objects held in the pocket.

A user may operate user input device 6 to instruct controller 8 to generate the enabling signal at controller output 9 causing the actuator 10 to operate. This causes the pocket to assume a configuration which restricts or impedes the removal of objects therefrom, with such restriction or impeding action occurring at the command of the user.

Now that the main functional elements of a pocket of the present invention have been discussed, some example pocket configurations will be described.

Figure 2:
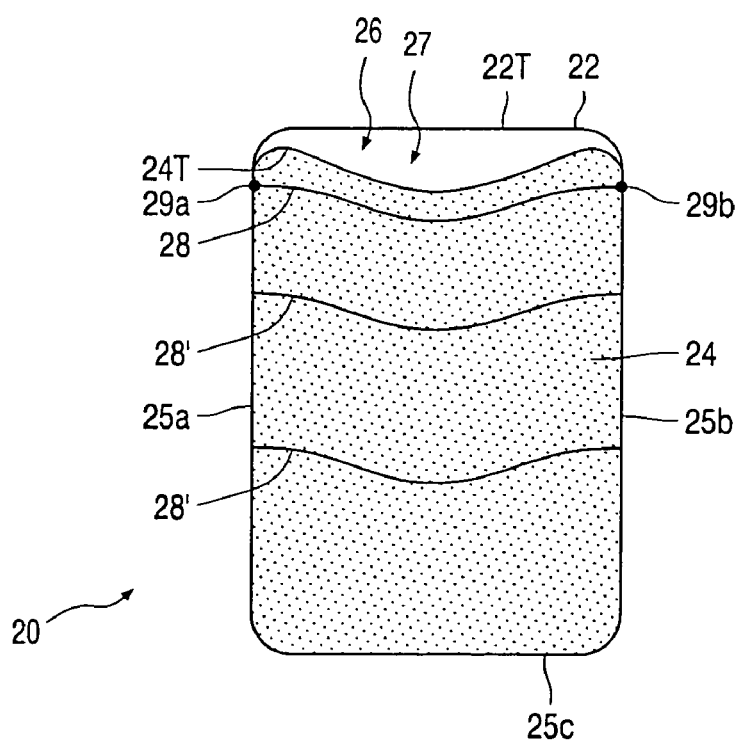
FIG. 2 shows a first embodiment of a pocket construction made in accordance with the present invention.

In a first embodiment a simple pocket construction 20 shown in FIG. 2 includes a semi-rigid rear panel 22 and a flexible front panel 24. The rear panel 22 and the front panel 24 are joined to each other in the vicinity of their periphery along a first side edge 25a, a second side edge 25b and base edge 25c. The panels may be joined by any suitable technique such as gluing or stitching as will be appreciated by the person skilled in the art. However, the top edge portion 22T of the rear panel is not joined to the top edge portion 24T of the front panel 24 in order to form a pocket opening 26 allowing access to interior pocket space 27.

An actuator 10 is provided in the form of a shape memory material 28 provided as an elongate component extending across the front panel 24 from the first side edge 25a to the second side edge 25b adjacent to the top edge portion 24T of the front panel 24, that is in the vicinity of the pocket opening 26. The shape memory material 28 is anchored to the pocket 20 at location 29a in the region of the first side edge 25a and location 29b in the region of the second side edge 25b. The anchor locations 29a and 29b are maintained in spaced relation to each other due to the properties of the semi-rigid rear panel 22.

The shape memory material 28 used in this embodiment is provided as a length of shape memory material. An example of such material is Nickel Titanium alloy which is also known as Nitinol, although other known trade names for such shape memory materials include Tinel, Flexinol, Muscle Wire, Smart Wire, Dynalloy, NiTi and TiNi.

The properties of shape memory alloys such as nickel titanium alloy are such that they undergo a phase transformation in their crystal structure with a change in temperature. The temperature around which phase transformation takes place can be governed by controlling the alloy composition. When the material is at temperatures higher than the temperature range where phase transformation occurs the material is in the so-called high temperature (austenite) form. While in this "high temperature" form the material will allow a deformation to occur on the application of stress, but will return to its original shape on removal of the stress. When at temperatures lower than the temperature range where the phase transformation occurs the material is in the so-called "low temperature" (martensite) form. While in this "low temperature" form the material can also be deformed but much more easily (that is with the application of less stress) than when the material is in the high temperature form. Furthermore, on removal of the stress, the material remains in the deformed configuration and does not return to its original shape. However, if the material is now heated to its "high temperature" (austenite) state the material will return to its original shape, which is why the material is said to have "shape memory". Because much higher stresses are required to cause deformation to the material when in the austenite phase that are required when in the martensite phase, the effect of heating deformed material from the low temperature martensite form to the high temperature austenite form is that the material can regain its original shape and may do so with considerable force. Such force is often greater than the stress that was applied to deform the material in the low temperature phase in the first place, with the effect that the material may be capable of regaining its original shape even in the presence of the stress used to cause the deformation. This behaviour has resulted in nickel titanium alloy wire being known as "Muscle Wire".

The shape memory material (in this case a length of nickel titanium alloy wire 28) is selected to be of a length such that in an original, substantially non deformed state it extends across the width of the front panel 24 in a relatively direct line between anchor points 29a and 29b. In general there will be substantially no slack in the wire. Such a direct line taken by the wire has the effect that it presses on the front panel 24 causing top edge portion 24T to be held against the top edge portion of semi-rigid rear panel 22T which means that pocket opening 26 will be closed. In order to gain access to the interior pocket space 27 the front panel top edge portion 24T may be eased away from the rear panel top edge portion 22T by a user. This process of easing the front panel top edge portion with sufficient force causes the shape memory material to stretch (that is deform). While the shape memory material is in the low temperature (martensite) form the material may be deformed to a stretched condition without the application of excessive stress, and the material remains stretched even when the stress has been subsequently removed. A pocket is now in an "open" configuration exhibiting pocket opening 26 and items can be inserted into and removed from the pocket in the normal manner.

Now assume that the controller 8 produces an enabling signal at output 9. This may be due to action of the user operating user input device 6, due to signals received from sensor 2 indicating that the pocket is about to assume or has already assumed an orientation where it is likely items will fall out of the pocket or due to signals received from sensor 4 indicating that the pocket is undergoing acceleration of the type where items could be ejected from the pocket. The enabling signal 9 is provided to actuator 10, in this case shape memory material 28 to cause heating of the shape memory material 28 such that it attains its high temperature (Austenite) form. On making transition to this phase the material regains its original shape which means that the nickel titanium wire 28 contracts to assume a direct line between anchor point 29a and 29b, which in the process pulls front panel top portion 24T against rear panel top portion 22T to urge the pocket opening 26 to close up in a manner so as to restrict or impede the removal of objects from the interior pocket space (or insertion of objects into the pocket space). The shape memory material may be heated by use of an external heat source, induction heating mechanism or any suitable method, as will be apparent to the person skilled in the art. However in this arrangement the shape memory material is heated by passing an electric current through the nickel titanium alloy wire 28 itself which generates heat through the well known Joule heating mechanism.

On removal of the enabling signal 9 the shape memory material cools to the low temperature form in which it can again be stretched by the application of stress to allow access to the internal pocket space 27.

The shape memory material 28 may be attached to the front panel 24 between anchor points 29a and 29b by providing the panel 24 with a conduit, channel or plurality of loops through which the shape memory material passes. The actuator 10 may be provided in the form of one or a plurality of components, for example as a single strand of wire 28 or a bundle of wires 28 to provide the required characteristic behaviour, strength and even redundancy should a strand break.

In addition to or instead of providing shape memory material 28 at the top edge 24T of the panel near the pocket opening, shape memory material may be arranged to extend across other regions of the pocket between first and second side edges 25a and 25b as is denoted by items 28'. As shown, the additional shape memory metal elements 28' are arranged parallel with the shape memory material 28, but lower down the pocket to span the front panel 24 but spaced from the pocket opening 26. These components 28' operate in a similar way to shape memory component 28 but not to close the pocket opening 26 itself. However, it will be appreciated that such components will still be capable of providing a restricting action to serve to retain some items in the pocket 20.

It is preferred that the shape memory material is of a composition such that any ambient temperatures in which the pocket is expected to be used will fall within the low temperature (martensite) range of the material in order to avoid unintentional operation. It is also preferable that the transition temperature is not so high that the shape memory material needs to be excessively insulated to avoid damage to the pocket, article the pocket is attached to, or to avoid causing discomfort to a user. In one specific example the transitional temperature between the martensite and austenite form was 70 degrees Celsius but a temperature closer to 60 degrees Celsius is also suitable.

Figure 3:
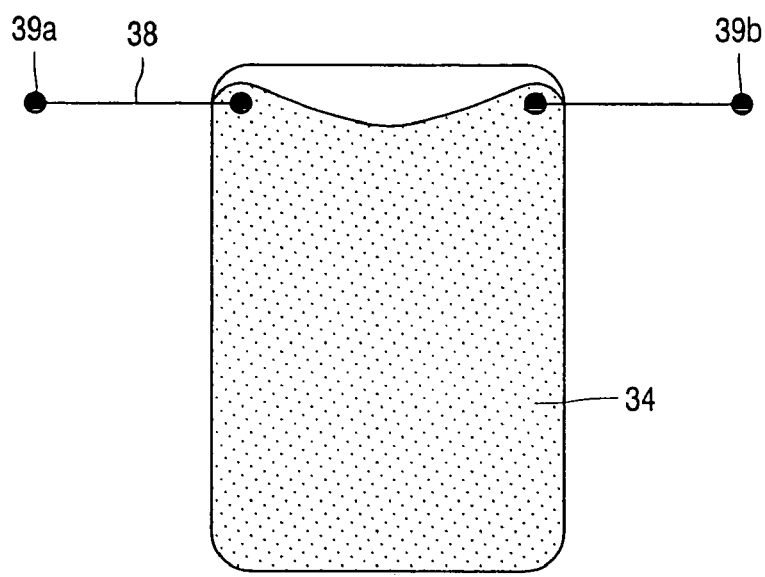
FIG. 3 shows a second embodiment of a pocket construction made in accordance with the present invention.

A second embodiment is shown in FIG. 3 which is similar to the first embodiment but which performs without the requirement of the rear panel 22 needing to be semi-rigid. In this arrangement the shape memory material 38 is anchored at points 39a, 39b located beyond the pocket region on a garment or article carrying the pocket rather than the pocket itself. The anchor points 39a, 39b are maintained in spaced relation by the garment or article construction. The shape memory material 38 may be the same as the shape memory material 28 and in this instance operates in a similar manner to that described above. Once again, restriction of the shape memory material to regain its original shape causes closure of the pocket opening. The shape memory material may be attached to the pocket front panel 34 by providing the panel with a conduit, channel, or plurality of loops through which the shape memory material passes. Further examples of shape memory material may be included at other portions of the pocket.

Figure 4:
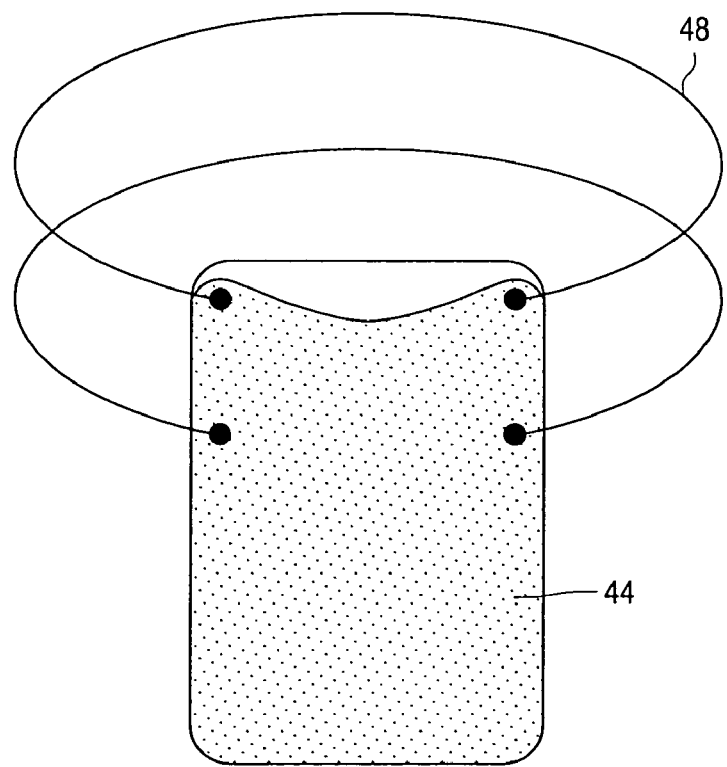
FIG. 4 shows a third embodiment of a pocket construction made in accordance with the present invention.

A third embodiment is shown in FIG. 4 but here the shape memory material 48 is formed as a loop. The shape memory material 48 may be of the same type as the shape memory material 28 or 38 and therefore will operate in a similar manner to that described above. The shape memory material may be attached to the front panel 44 by providing the pocket with a conduit, channel or plurality of loops through which the shape memory material passes. However, because the shape memory material is formed as a loop it may be arranged within garments in a path that also forms a loop. For example, when the pocket is located on an arm section of a garment, which has a generally circular cross section, the loop may be arranged to circle the arm portion so as to travel around the arm of a person when wearing a jacket. On activation of the pocket a constricting action will pull the pocket front panel 44 towards the arm of the user therefore giving rise to a restricting action. Strengthening rings may be provided in the arm section and also circle the arm portion so that the restricting action of the loops of shape memory material 48 is borne by the strengthening rings therefore avoiding imparting an uncomfortable restricting action on the arm of a wearer.

While the present invention has been described with reference to actuators formed of shape memory alloy, other techniques may be employed for providing an actuator capable of closing a pocket opening or providing a restricting action to secure any items in the pockets. Such possibilities include the provision of bimetallic strips fastened to portions of the pocket which strips are able to undergo a change in shape on occurrence of the enabling signal or use of electromagnetic or other devices capable of behaving as an actuator as required by a pocket of the present invention.

It is also possible that shape memory material may be woven, knitted or braided to produce an actuator having required operational characteristics. Indeed, such techniques may be employed to integrate an actuator into components, such as textile material, that are part of the pocket or the article in which the pocket is incorporated.

Furthermore, while a very simple pocket construction has been described and illustrated as comprising merely of a front panel and a rear panel this is for the purpose of clarity. In practice a pocket may take a different form with each panel consisting of one or more layers, and component parts of different shape, orientation or construction generally, as will be appreciated by persons skilled in the art. One or more portions of the pocket may be provided by a component of the garment, personal luggage item or other article to which the pocket is applied. Although the front panel of the pocket is described as the one acted on by the restriction means this is not to be construed as a limitation and it will be appreciated by the person skilled in the art that other pocket designs may use the restriction means to act on other components of the pocket while remaining within the scope of the present invention. While three example sources of controller input signal sources have been described it is not essential that all are present. The controller may be a logic device or microprocessor. Various components of the present invention may actually be incorporated as parts of other devices, especially in the form of wearable electronic apparatus and/or wearable computing apparatus.

From reading the present disclosure, other modifications will be apparent to persons skilled in the art. Such modifications may involve other features which are already known in the design, manufacture and use of systems and devices, actuators, apparel and furnishings and component parts thereof and which may be used instead of or in addition to features already described herein.

The invention claimed is:

1. A pocket, including
a restrictor configured to restrict an insertion of objects into, or removal of objects from the pocket,
the restrictor being controllable deformable and to apply a restricting action on an occurence of an electronic enabling signal;
wherein
the pocket is configured to be incorporated in a wearable garment.

2. The pocket of claim 1 wherein
the electronic enabling signal is generated via a command of a user.

3. The pocket of claim 1 wherein
the enabling signal is generated in response to an output signal status of at least one sensor.

4. The pocket of claim 1 wherein
the pocket is provided with a closable access opening communicating with interior pocket space and
the restrictor serves to urge the access opening closed on an occurence of the electronic enabling signal.

5. The pocket of claim 1 wherein
the restricting action terminates on cessation of the electronic enabling signal.

6. A restrictor comprising:
a restrictive element that is configured to restrict an insertion of objects into, or removal of objects from a pocket,
the restrictive element being controllable deformable and to apply a restricting action on the occurrence of an electronic enabling signal,
the restricting action being provided by a change of shape of the restrictive element.

7. An object comprising a pocket that includes
a restrictive element that is configured to restrict the insertion of objects into, or removal of objects from the pocket,
the restrictive element being controllable deformable and to apply a restricting action on an occurence of an electronic enabling signal,
the restricting action being provided by a change of shape of the restrictive element.

* * * * *